(12) United States Patent  
Dustman

(10) Patent No.: US 11,941,333 B2  
(45) Date of Patent: Mar. 26, 2024

(54) POWER CONTROL SYSTEM (PCS) SEQUENCER

(71) Applicant: ASCO Power Technologies, L.P., Florham Park, NJ (US)

(72) Inventor: William J. Dustman, Lexington, NC (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 909 days.

(21) Appl. No.: 16/945,266

(22) Filed: Jul. 31, 2020

(65) Prior Publication Data

US 2022/0035976 A1  Feb. 3, 2022

(51) Int. Cl.
*G06F 30/31* (2020.01)
*G06F 113/04* (2020.01)
*G06F 119/06* (2020.01)

(52) U.S. Cl.
CPC .......... *G06F 30/31* (2020.01); *G06F 2113/04* (2020.01); *G06F 2119/06* (2020.01)

(58) Field of Classification Search
CPC ... G06F 30/31; G06F 2113/04; G06F 2119/06
USPC ......................................................... 703/18
See application file for complete search history.

(56) References Cited

PUBLICATIONS

Blaabjerg, Frede, et al. "Overview of control and grid synchronization for distributed power generation systems." IEEE Transactions on industrial electronics 53.5 (2006). pp. 1398-1409. (Year: 2006).*

* cited by examiner

*Primary Examiner* — John E Johansen
(74) *Attorney, Agent, or Firm* — Locke Lord LLP

(57) ABSTRACT

Systems and methods for demonstrating power control system (PCS) operating sequences provide a model builder and a sequence builder. The PCS model builder allows a user to build a graphical model of a PCS using drag-and-drop objects representing PCS components, such as generators, circuit breakers, transfer switches, and the like. The PCS sequence builder allows the user to enter plain language commands that represent operations performed by the model objects. The model builder then graphically animates the model according to the plain language commands. Animation may include changing an image color, shape, configuration, position, orientation, or size for the model objects. This allows any user to graphically demonstrate how a PCS would work before resources are invested toward developing the PCS.

20 Claims, 8 Drawing Sheets

400 ⤵

| Sequence # ~402 | 1 | |
|---|---|---|
| Number of Events: | 10 | |
| Starting Conditions: | GEN1_OFF, GEN2_OFF, CB1_OPEN, CB2_OPEN, CB3_OPEN, CB4_OPEN, CB5_OPEN, CB6_OPEN, ATS1_OFF_E, ATS1_ON_N, ATS2_OFF_E, ATS2_ON_N, ATS3_OFF_E, ATS3_ON_N, ATS4_OFF_E, ATS4_ON_N, | |
| Sequence Title: | Loss of utility power with 1st backup and recovery | 414 |
| Time/Step [=1.0 sec] | Events/Operations ~412 | Event Information |
| 1 | | Loss of utility power |
| 2 | | Loss of utility power |
| 3 | GEN1_ON, CB1_CLOSED | 1st backup online |
| 4 | CB3_CLOSED, CB5_CLOSED | Power to preferred loads |
| 5 | ATS1_ON_E, ATS1_OFF_N, ATS3_ON_E, ATS3_OFF_N | Power to preferred loads |
| 6 | | Waiting |
| 7 | | Waiting |
| 8 | | Utility power recovered |
| 9 | ATS1_OFF_E, ATS1_ON_N, ATS3_OFF_E, ATS3_ON_N | ATS return to normal |
| 10 | GEN1_OFF, CB1_OPEN, CB3_OPEN, CB5_OPEN | 1st backup offline |
| | | |
| | | |

FIG. 4

POWER CONTROL SYSTEM (PCS) SEQUENCER

TECHNICAL FIELD

The present disclosure relates generally to power control systems and particularly to systems and methods for visually animating an operational sequence of a power control system.

BACKGROUND

A power control system (PCS) typically include a combination of electrical power components that operate in conjunction with one another, such as backup generators, transformers, circuit breakers, fuses, transfer switches, distribution panels, buses, and the like. The PCS ensures safe, efficient, and reliable supply of electrical power to a building, plant, or home. A sudden loss of electrical power can cause potentially critical disruptions of services, for example, in hospitals, water treatment plants, telecommunications networks, and the like. It is therefore important that any PCS be carefully designed and tested before the system is put into operation.

One of the most important design aspects of a PCS is the sequence of operation of the PCS. This sequence refers to the order that generators turn on and off, circuit breakers open or close, transfer switches switch to emergency power or normal power, and so forth, upon occurrence of certain events, like loss of utility power. Such sequences are currently manually defined in documents that list the operations performed by the various components of the PCS and the order in which they will occur. A well-written sequence document will include both a normal operation sequence as well as one or more alternative or backup operation sequences.

The sequences contained in a sequence document need to be validated during pre-design to ensure they work as intended prior to committing design resources. For a complex PCS involving dozens of components, however, the sequence document can run well over a hundred pages. It is difficult even for experienced designers and engineers to follow the sequences in such a lengthy document. Moreover, there is currently little standardization among different preparers of such sequence documents, thus making them even more difficult to follow.

SUMMARY

Embodiments of the present disclosure relate to systems and methods for graphically demonstrating PCS operating sequences. The systems and methods provide a PCS model builder that allows a user to build, construct, or assemble a graphical model of a PCS using predefined drag-and-drop model objects representing PCS components. These model objects may include objects that represent backup generators, transformers, circuit breakers, fuses, transfer switches, distribution panels, buses, and other PCS components. The systems and methods further provide a PCS sequence builder that allows the user to define one or more PCS sequences for the PCS model. The PCS sequence builder lets the user specify a series of plain language commands or instructions for each sequence, each command or instruction reflecting or representing an operation performed by a model object, as well as the timing or order of each command or instruction within the sequence. The plain language commands and instructions may include commands and instructions that represent, for example, generator start and stop operations, circuit breaker open and close operations, transfer switch switching operations, and the like.

The disclosed systems and methods then demonstrate operation of the PCS model by accessing whichever PCS sequence is selected in the PCS model builder, processing the commands and instructions contained in that sequence, and graphically animating the model in the model builder according to the commands and instructions. Animation may include changing an image of a given object, such as a color, shape, or configuration of the image, changing a position or orientation of the image, changing a size of the image, and the like. The PCS sequence may run entirely automatically, or the user may manually control the sequence or portions thereof via interface controls provided in the model builder. For a given PCS model, the user may drag-and-drop to add, remove, and otherwise rearrange objects on the fly in the model builder to effect modifications to the model. The above arrangement advantageously allows any user, even non-programmers, to quickly and easily demonstrate how a contemplated PCS would work during an initial or preliminary stage before significant resources are invested toward designing and developing the PCS.

In general, in one aspect, embodiments of the present disclosure relate to a system for graphically demonstrating a PCS sequence. The system comprises, among other things, a display, a processor coupled to control operation of the display, and a storage device coupled to communicate with the processor. The storage device stores a PCS sequencer thereon that, when executed by the processor, causes the system to display a PCS model builder screen on the display. The PCS model builder screen includes a workspace to build or edit a PCS model, and an object selection area containing predefined model objects that are dragged and dropped onto the workspace to build or edit the PCS model. Each model object representing a PCS component, and the PCS model builder screen presenting an image associated with each model object at a location in the workspace where said model object is dropped. The processor also causes the system to display a PCS sequence builder form on the display to define a PCS sequence for the PCS model, the PCS sequence builder form including an operations list having a plurality of entries. Each entry is filled in with one or more commands for the model objects in the PCS model, each command representing a model object operation. The processor further causes the system to determine an amount of actuation of the model objects, from an interface control, the amount of actuation indicating a manner in which the system applies the PCS sequence to the PCS mode. The processor still further causes the system to apply the PCS sequence to the PCS model in the manner indicated by the amount of actuation on the PCS model builder screen. The PCS model builder screen changes the image presented in the workspace for a model object based on a command in the operations list for said model object, the changing of the image appearing as animation of said model object.

In general, in another aspect, embodiments of the present disclosure relate to a method for graphically demonstrating a PCS) sequence. The method comprises, among other things, displaying a PCS model builder screen on a display, the PCS model builder screen including predefined model objects, each model object representing a PCS component. The method also comprises receiving input to drag and drop one or more predefined model objects to selected locations on the screen to build or edit the PCS model, and presenting an image associated with each model object at a location on the screen where said model object is dropped. The method further comprises displaying a PCS sequence builder form on the display to define a PCS sequence for the PCS model, the PCS sequence builder form including an operations list having a plurality of entries, and receiving input to fill in each entry with one or more commands for the model objects in the PCS model, each command representing a model object operation. The method yet further comprises determining an amount of actuation of the model objects, from an interface control, the amount of actuation indicating a manner in which the PCS sequence is searched. The method still further comprises sequentially searching the PCS sequence in the manner indicated by the amount of actuation on the PCS model builder screen, and changing the image presented on the screen for a model object in response to finding a command in the operations list referencing said model object, the changing of the image appearing as animation of said model object.

In general, in another aspect, embodiments of the present disclosure relate to a non-transitory computer-readable medium comprising computer-readable instructions for graphically demonstrating a PCS sequence, the computer-readable instructions comprising instructions for causing a processor to perform a method as described above.

In accordance with any one or more of the foregoing embodiments, the PCS sequence builder form further includes a sequence identification field that is filled in with a sequence identifier for the PCS sequence, or a starting condition field that is filled in with a starting condition for each model object in the PCS model. In accordance with any one or more of the foregoing embodiments, the PCS model builder screen further includes a plurality of model object controls that control the model objects. In accordance with any one or more of the foregoing embodiments, the PCS sequence is applied in the manner indicated by the amount of actuation by applying the PCS sequence to the PCS model automatically at a specified speed, or by applying the PCS sequence to the PCS model as controlled via the interface control. In accordance with any one or more of the foregoing embodiments, the PCS model and the PCS sequence are stored together as one file.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 4 is a form layout for an exemplary PCS sequence builder according to embodiments of this disclosure;

Identical reference numerals have been used, where possible, to designate identical elements that are common to the figures. However, elements disclosed in one embodiment may be beneficially utilized on other embodiments without specific recitation.

DETAILED DESCRIPTION

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
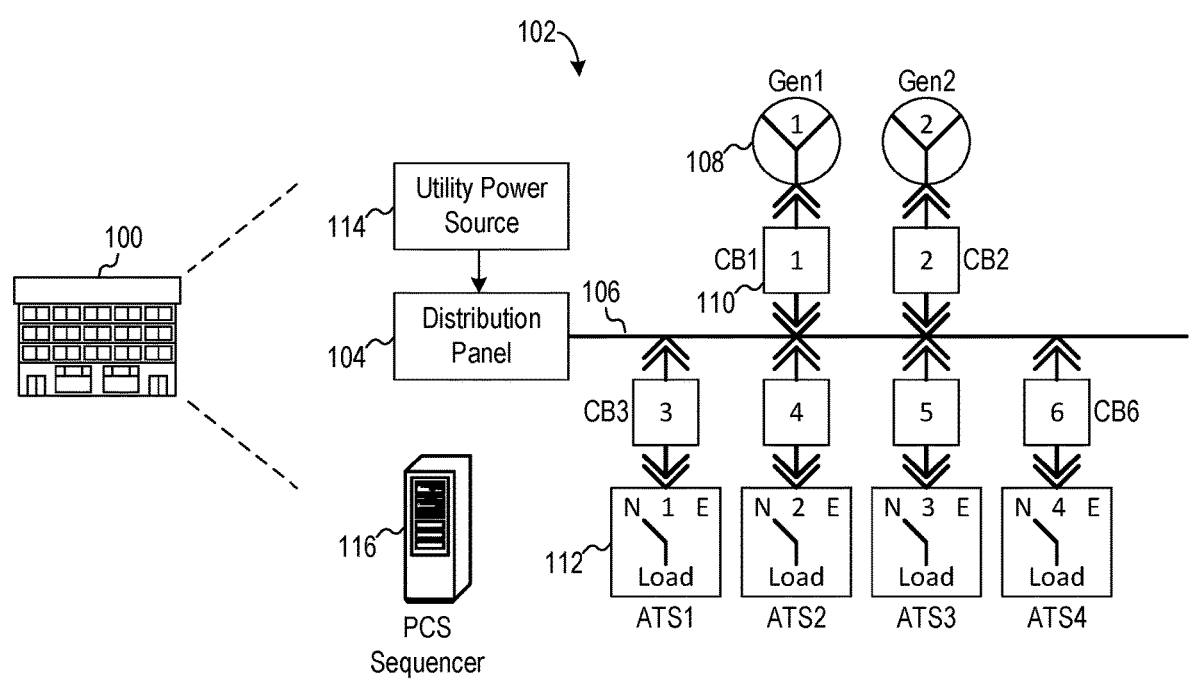
FIG. 1 is a schematic diagram for an exemplary PCS for a facility according to embodiments of this disclosure.

Referring now to FIG. 1, a block diagram for an exemplary facility 100 is shown having a power control system (PCS) 102 that was developed according to embodiments of the present disclosure. As can be seen, the exemplary PCS 102 combines several electrical power components that operate in conjunction with one another, including a power distribution panel 104, a power bus 106, and backup power generators 108, labeled Gen1 and Gen2. Each generator 108 is connected to a respective circuit breaker 110, labeled CB1 and CB2, that is in turn connected to the power bus 106. There are also several automatic transfer switches 112 in the PCS 102, labeled ATS1, ATS2, ATS3, and ATS4. Each ATS 112 is likewise connected to a respective circuit breaker 110, labeled CB3, CB4, CB5, and CB6, that is in turn connected to the power bus 106. Electrical power for the facility 100 is normally provided by a utility power source 114, such as a local power plant.

Although the example of FIG. 1 depicts a facility 100, embodiments of the present disclosure are equally applicable to other types of PCS installations, including an office building PCS, an industrial plant PCS, as well as a residential home PCS. In addition, although generators, circuit breakers, and transfer switches are shown in the PCS 102, embodiments of the present disclosure also contemplate other types of electrical power components, such as those mentioned previously herein, and others.

In accordance with embodiments of the present disclosure, a PCS sequencer system 116 can be used in developing the PCS 102, either on-site at the facility 100 or another location. The PCS sequencer system 116 allows the operating sequence of the PCS 102 to be graphically animated during an initial, pre-design stage of development. This helps designers and engineers see and thus more easily follow and validate the operating sequence of the PCS 102 early on. As a result, the PCS 102 is able to proceed directly to design, development, and testing, and subsequently to installation at the facility 100 more expeditiously.

Figure 2:
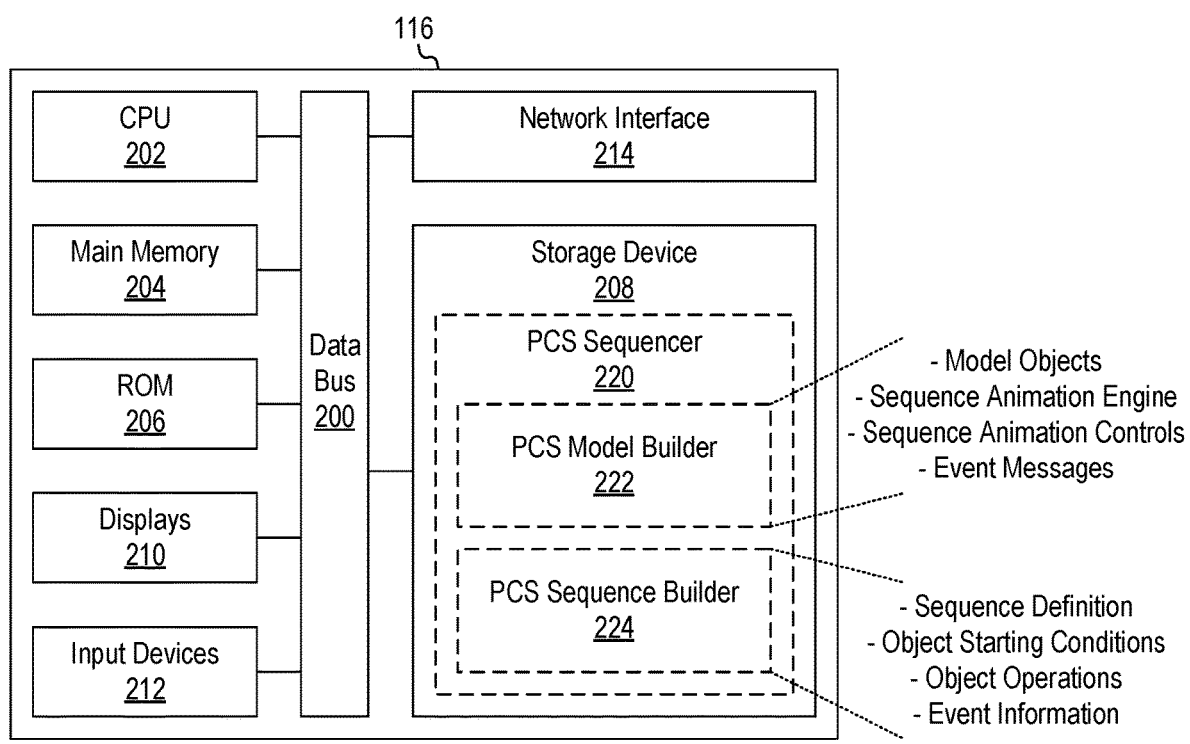
FIG. 2 is a block diagram for an exemplary PCS sequencer according to embodiments of this disclosure.

FIG. 2 illustrates the exemplary PCS sequencer system 116 of FIG. 1 in more detail according to embodiments of this disclosure. The PCS sequencer system 116 may be implemented as an application on a conventional workstation, desktop, or laptop computer, or it may be an app on a mobile or handheld device. In the example shown, the PCS sequencer system 116 may include a data bus 200 or other communication mechanism for transferring information, and a CPU 202 coupled with the data bus 200 for processing the information. The PCS sequencer system 116 may also include a main memory 204, such as a random access memory (RAM) or other dynamic storage device coupled to the bus 200 for storing computer-readable instructions to be executed by the CPU 202. The main memory 204 may also be used for storing temporary variables or other intermediate information during execution of the instructions to be executed by the CPU 202. The PCS sequencer system 116 may further include a read-only memory (ROM) 206 or other static storage device coupled to the data bus 200 for storing static information and instructions for the CPU 202. A computer-readable storage device 208, such as a Flash drive or magnetic disk, may be coupled to the bus 200 for storing information and instructions for the CPU 202.

The term "computer-readable instructions" as used above refers to any instructions that may be performed by the CPU 202 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 208. Volatile media may include dynamic memory, such as main memory 204. Transmission media may include coaxial cables, copper wire and fiber optics, including the wires of the data bus 200. Transmission itself may take the form of electromagnetic, acoustic or light waves, such as those generated during radio frequency (RF) and infrared (IR) data communications. Common forms of computer-readable media may include, for example, a floppy disk, a flexible disk, hard disk, magnetic tape, other magnetic medium, a CD ROM, DVD, other optical medium, a RAM, a PROM, an EPROM, a FLASH EPROM, other memory chip or cartridge, or any other non-transitory medium from which a computer can read.

The CPU 202 may also be coupled via the data bus 200 to one or more display devices 210 for displaying the animation of operation sequences and other aspects of the system 116 to a user. One or more input devices 212, including alphanumeric and other keyboards, mouse, trackball, cursor direction keys, touchscreens, and so forth, may be coupled to the data bus 200 for communicating information and command selections to the CPU 202. A communications interface 214, which may be a network interface, may be provided for allowing the PCS sequencer system 116 to communicate with an external system or network.

In accordance with embodiments of the disclosure, a PCS sequencer 220, or rather the computer-readable instructions therefor, may reside or be stored on the storage device 208. The PCS sequencer 220 operates to graphically demonstrate PCS operating sequences on the PCS sequencer system 116 (e.g., via the one or more display devices 210), as described later herein. Such a PCS sequencer 220 may be implemented in any programming language known to those skilled in the art using any suitable programming platform. Examples of suitable programming language include C, C++, Visual Basic, and the like. In some embodiments, the PCS sequencer 220 may be implemented using the built-in graphical user interface capability of certain versions of Microsoft Excel or similar software.

In the embodiment of FIG. 2, the PCS sequencer 220 includes two main subroutines or modules, a PCS model builder 222 and a PCS sequence builder 224. The PCS model builder 222 provides a graphical user interface (GUI) having predefined model objects representing PCS components that may be dragged and dropped to build a PCS model. These model objects may include objects that represent backup generators, transformers, circuit breakers, fuses, transfer switches, distribution panels, buses, and similar PCS components. The PCS sequence builder 224 provides a user-entry interface that allows the user to define one or more operating sequences for the PCS model created in the model builder. For each sequence, the user enters a series of plain language commands or instructions that are standardized across model objects. Each command or instruction represents, reflects, or otherwise conveys performance of a particular operation by a model object. The user can also specify the timing or order of the command or instruction within the sequence and the starting conditions of the objects. Examples of plain language commands and instructions may include commands and instructions representing a generator start or stop operation, a circuit breaker open or close operation, a transfer switch switching operation, and the like.

A sequence animation engine in the PCS model builder 222 thereafter accesses whichever sequence is currently selected for the model, processes the commands or instructions contained in that sequence, and graphically animates the model in the model builder according to the commands and instructions. Graphically animating the model may include changing an image (e.g., color, shape, configuration, etc.) for an object, a position or orientation of the image, a size of the image, and the like. During the animation, the PCS model builder 222 may also display messages containing information pertaining to the commands and instructions for each operation. The sequence may be run entirely automatically, or the user may interrupt the sequence and manually step through a portion or all of the sequence via interface controls provided in the model builder 222.

Figure 3:
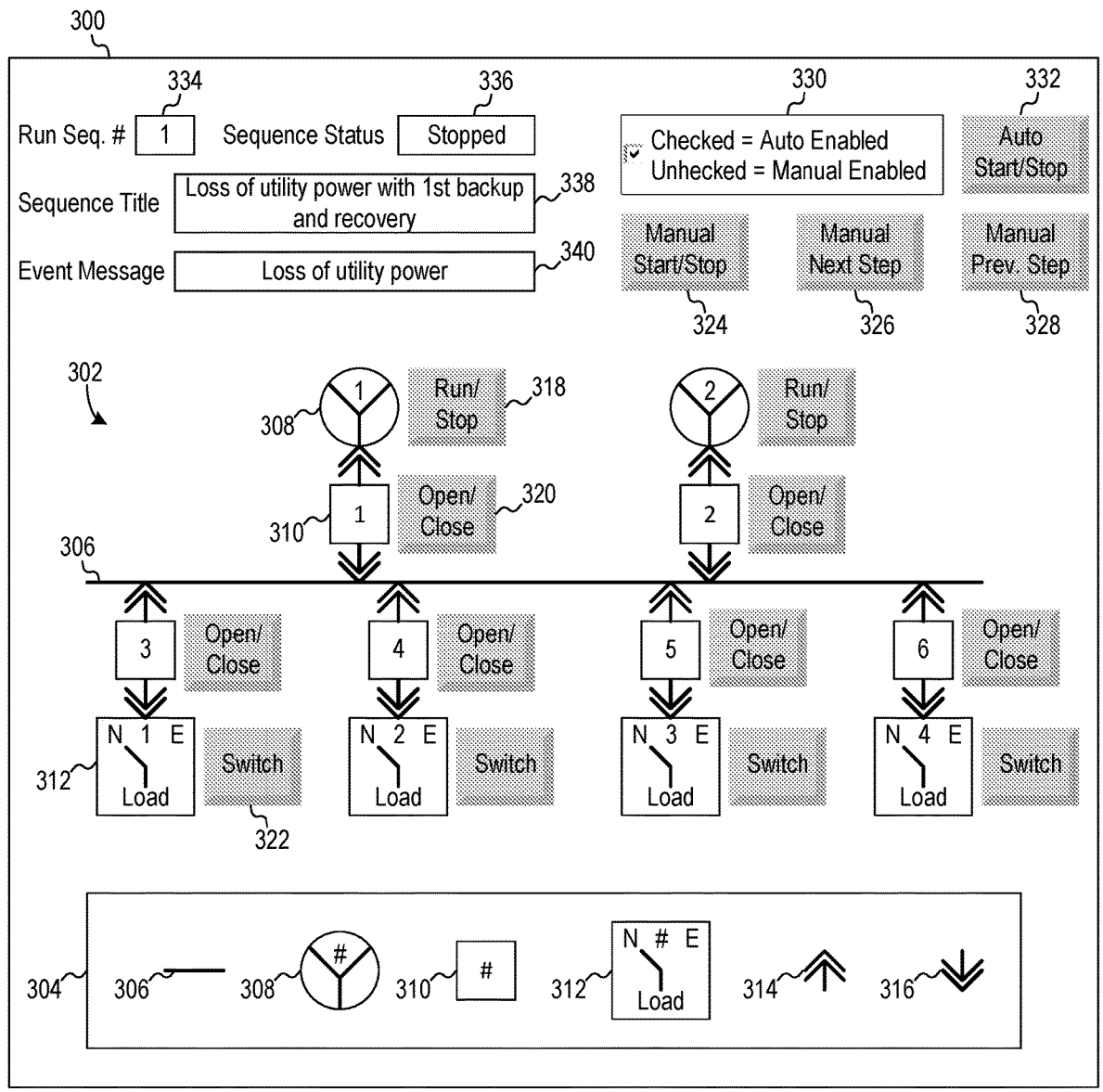
FIG. 3 is a screen layout of an exemplary PCS model builder according to embodiments of this disclosure.

FIG. 3 shows an exemplary implementation of the PCS model builder GUI as a model builder page or screen 300 according to some embodiments. In this example, the model builder page or screen 300 has a workspace 302 where a model of a PCS can be built and edited, and an object selection area 304 containing a set of predefined model objects that can be selected to build or edit the PCS model. Examples of model objects include a power bus object 306, a generator object 308, a circuit breaker object 310, an ATS object 312, an up connector 314, and a down connector 316. Each type of model object has a set of object properties that are defined by the user when the object is initially set up, which the user may modify as needed. These properties may include, among other things, the object type, states, commands, images, and the manual control for the object. Following are examples of properties for several model objects.

TABLE 1

Properties for Generator Object

| Object Type | Generator | |
|---|---|---|
| Object States | Off, On | |
| Object # | User Selected | |
| Commands | GEN#_OFF | GEN#_ON |
| Object Image | (White image) | (Green image) |
| Manual Control | Run/Stop | |

TABLE 2

Properties for Circuit Breaker Object

| Object Type | Circuit Breaker | |
|---|---|---|
| Object States | Open, Closed | |
| Object # | User Selected | |
| Commands | CB#_OPEN | CB#_CLOSED |
| Object Image | (Green image) | (Red image) |
| Manual Control | Open/Close | |

TABLE 3

Properties for ATS Object

| Object Type | Automatic Transfer Switch | |
|---|---|---|
| Object States | Normal, Emergency | |
| Object # | User Selected | |
| Commands | ATS#_OFF_E, ATS#_ON_N ATS#_OFF_C | ATS#_ON_E, ATS#_OFF_N |
| Object Image | 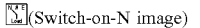(Switch-on-N image) 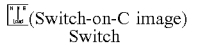(Switch-on-C image) | 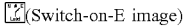(Switch-on-E image) |
| Manual Control | Switch | |

In the exemplary property tables above, the Object Type field specifies the type of PCS component (e.g., generator, circuit breaker, ATS, etc.) represented by a model object. The Object #field is a user-selectable field that is filled in by the user to identify a model object when the object is placed onto the workspace 302 (e.g., by tapping or right-clicking on the object and entering the identifier). Each model object should have a different identifier, but two or more model objects of the same type may have the same identifier in some embodiments for convenient reference in the PCS sequence. This identifier (e.g., number, letter, alphanumeric string, etc.) is then displayed on or near the model object in the workspace 302 to visually identify that object. The Object States field specifies the operating states that are available for the object, and the Commands field contains the plain language commands and instructions available for representing the operations performed by the object to enter the operating state.

The Object Image field specifies the image or icon to be displayed for a model object in the workspace 302 at the location where the object is dropped onto the workspace 302. This image or icon is changed in the workspace 302 according to whichever command or instruction is encountered for the model object in the PCS sequence. The change to the image or icon in the workspace 302 gives the appearance of motion or movement (hence animation) by the object. Finally, the Manual Control field specifies the type of model object control (e.g., Run/Stop, Open/Close, Switch, etc.) that is displayed next to the object in the workspace 302.

The above tables are exemplary only and those having skill in the art will appreciate that additional, alternative, and variations to the properties and fields shown are available within the scope of the present disclosure. For example, plain language commands different from those shown in the tables may be used for each object type. Different images, or different image size, shape, or color, may also be used for each object type. For example, if the user has a diminished ability to see a certain color (e.g., green color), a more effective color may be selected. For model objects like an ATS that can have more than two operating states (e.g., Normal, Emergency, Center (off)), the object images may include a sufficient number of options (e.g., more than two colors, more than two shapes, more than two configurations, etc.) to represent each state.

The PCS model shown in the workspace 302 is sometimes referred to as a "one-line diagram" because it depicts one line or phase of a three-phase power system. In the example, the user has populated the one-line diagram by dragging and dropping selected model objects to build a PCS model that reflects the PCS 102 from FIG. 1. Once a model object is dropped into the one-line diagram, the manual control for that object is displayed next to the object. For example, a Run/Stop model object control 318 would be displayed next to each generator model object 308, an Open/Close model object control 320 would be displayed next to each circuit breaker model object 310, and a Switch model object control 322 would be displayed next to the ATS model object 312.

The model builder screen 300 also provides several manual interface controls that allow the user to manually control whichever sequence is being run. For example, there is a Manual Start/Stop interface control 324, a Manual Next Step interface control 326, and a Manual Previous Step interface control 328. An Auto/Manual Checkbox 330 allows the user to selectively run the sequence in automatic mode or manual control mode, and an Auto Start/Stop control 332 allows the user to start and stop the sequence while in automatic mode. The PCS model builder 222 then determines from the interface controls an amount of control or actuation to be used for the model object. The amount of actuation sets or indicates the manner in which the selected PCS sequence is applied to the PCS model. Following is a brief description of the various interface and model object controls.

Auto/Manual Checkbox: If checked, this control enables the Auto Start/Stop control. If not checked, this control enables the Manual Start/Stop control.

Auto Start/Stop: This control enables automatic running of whichever sequence is currently selected. The Auto Start/Stop control may be momentarily touched, then touched again, to put the sequence at initial conditions without starting the sequence.

Manual Start/Stop: This control initiates a manual sequence walk-through starting at the beginning of the sequence and enables the Next Step and Previous Step manual controls. This control is enabled if the Auto/Manual Checkbox is unchecked.

Manual Next Step: When enabled, touching this control advances the sequence to the next step.

Manual Prev. Step: When enabled, touching this control returns the sequence to the previous step unless the sequence is already at the beginning.

Circuit Breaker Open/Close: This control opens or closes the circuit breaker when the sequence is not running in automatic mode.

Generator Run/Stop: This control runs or stops the generator when the sequence is not running in automatic mode.

ATS Switch: This control toggles the ATS between normal power, emergency power, and off when the sequence is not running in automatic mode.

In addition to the various manual controls, the model builder screen 300 in this example also displays several information fields that provide information about the sequence being run for user consumption. For example, a Run Seq. #field 334 allows the user to specify which one of potentially dozens of sequences to run on the model, and a Sequence Status field 336 indicates the current status of the sequence, such as whether the sequence is stopped or running, and the step number if the sequence is currently running. A Sequence Title field 338 displays the title of the currently selected sequence, and an Event Message field 340 displays a user-definable message related to the current step in the sequence.

The above arrangement allows any user, even non-engineers, to quickly and easily build and edit a model of a PCS, and to show how the PCS would work for any given sequence. For any given sequence, the user can drag-and-drop to add, remove, and otherwise rearrange the PCS model as desired with respect to that sequence. The sequence will proceed as defined and will simply skip over any model objects specified in the sequence, but not found in the model. The sequences themselves may be built and edited using a sequence builder form, as discussed in FIG. 4.

FIG. 4 illustrates an exemplary implementation of the PCS sequence builder user-entry interface as a fillable form 400 that allows the user to define a PCS sequence. The sequence builder form 400 contains a plurality of sequence fields that the user may fill in with numbers or text, or both, to define a sequence. Examples of sequence fields include a Sequence #field 402, a Number of Events field 404, a Starting Conditions field 406, a Sequence Title field 408, a Time/Step list 410, an Events/Operations list 412, and an Event Information list 414. These fields and lists and the contents thereof are what the model builder 222 uses to graphically animate the PCS model in the model builder screen 300 when a sequence is run.

The Sequence #field 402 contains a user-provided sequence identifier that is used in the model builder screen 300 to specify which particular sequence to run. The Number of Events field 404 allows the user to specify the number of steps to run for a given sequence. This number may be less than the total number of steps contained in a sequence if the user wishes to run only part of the sequence. The Starting Conditions field 406 allows the user to specify the starting condition for the objects in the model, with the default starting condition being the first state listed in the properties table for that object. The Sequence Title field 408 allows the user to specify the sequence title to be displayed in the model builder screen 300 for the sequence.

The Time/Step list 410 holds a sequential numeric listing of steps that are automatically generated and incremented by the sequence builder 224. When the sequence is run, there is a time delay between each step that can be specified by the user. The time delay in this example is 1.0 sec, but a different time delay can be specified (e.g., 0.5 sec, 2.0 sec, 3.0 sec, etc.) to control the speed at which the sequence is run. For example, a user with excellent eyesight may wish to run a sequence as quickly as possible without compromising comprehension, whereas a user with poor eyesight may wish to slow down the sequence to a speed that is more comfortable for that user.

The Events/Operations list 412 allows the user to specify one or more commands and instructions to be performed for a given step in the Time/Step list 410. For a given type of object, the commands and instructions that the user may enter in the Events/Operations list 412 are the ones listed in the properties table for that type of object. Each step in the Time/Step list 410 corresponds to at least one command or instruction in the Events/Operations list 412, so some steps may correspond to more than one command or instruction. The Event Information list 414 allows the user to enter an informational message for each command or instruction, which is then displayed in the model builder screen 300 when that command or instruction is encountered. Following are examples of commands.

GEN #_ON: starts the specified generator.
GEN #_OFF: stops the specified generator.
CB #_CLOSED: closes the specified circuit breaker.
CB #_OPEN: opens the specified circuit breaker.
ATS #_ON_E: switches the specified ATS on to emergency power.
ATS #_ON_N: switches the specified ATS on to normal power.
ATS #_OFF_E: switches the specified ATS off of emergency power.
ATS #_OFF_N: switches the specified ATS off of normal power.
ATS #_OFF_C: switches the specified ATS to the center (off).

In general operation, checking the Auto/Manual Checkbox 330 puts the object builder screen 300 in automatic run mode. Thereafter, touching or clicking the Auto Start/Stop interface control 332 causes the PCS model builder 222 to determine the amount of actuation of the model objects. In this case, the PCS model builder 222 determines, from the Auto Start/Stop interface control 332, that the amount of actuation of the model objects is automatic actuation at the speed (i.e., time delay) specified in the sequence. The PCS model builder 222 then automatically runs the specified sequence at the specified speed. This initiates an internal counter or timer (e.g., in CPU 202) that increments automatically. One count or one second on the counter or timer corresponds to entry number 1 in the Time/Step list 410, two counts or two seconds corresponds to entry number 2 in the Time/Step list, and so on.

Conversely, unchecking the Auto/Manual Checkbox 330 puts the object builder screen 300 in manual run mode. Thereafter, touching or clicking the Manual Start/Stop control 324 causes the PCS model builder 222 to again determine the amount of actuation of the model objects. This time, the PCS model builder 222 determines, from the Manual Start/Stop interface control 324, that the amount of actuation of the model objects is manual actuation. The PCS model builder 222 then initiates manual running of the specified sequence. In that case, the first touching or clicking of the Manual Next Step interface control 326 corresponds to entry number 1 in the Time/Step list 410, the next touching or clicking of the Manual Next Step interface control 326 corresponds to the next entry in the Time/Step list, and so on. Touching or clicking of the Manual Prev. Step interface control 328 moves the sequence back to the previous entry step.

After determining the amount of actuation of the model objects, the PCS model builder 222 accesses the specified sequence (e.g., Sequence #1) and searches the Starting Conditions field 406 in that sequence. The model builder 222 then sets (or resets) each model object in the one-line diagram by displaying the image therefor according the starting condition for that object found in the Starting Conditions field 406. When the counter or timer reaches one count or one second, or when the Manual Next Step interface control 326 is touched or clicked for the first time, the model builder 222 goes to entry number 1 in the Time/Step list 410 and searches the corresponding entry in the Event/Operations list 412. If the search finds a command or instruction, the model builder 222 sets (resets) the image in the one-line diagram for whichever object is referenced in the command or instruction based on the command or instruction. The model builder 222 also reads the corresponding informational message in the Event Information list 414 and displays that message in the Event Message field 340 on the model builder screen 300. This process continues until the model builder 222 reaches a number in the Time/

Step list 410 that matches the number specified in the Number of Events field 404 for the specified sequence.

The above process results in a controlled graphical animation of the model in the one-line diagram according to the speed and direction (if manually controlled) desired by the user. The controlled animation allows the user to literally see how the PCS model would operate and to quickly discern any potential problems or issues (e.g., based on personal experience and observations). Thus, in some sense, embodiments of the present disclosure may be characterized as emphasizing graphical modeling more so than functional modeling (e.g., modeling the sufficiency of power provided, time lags, etc.) of the PCS. This emphasis on graphical modeling is particularly beneficial for pre-designing complex cases where the PCS sequence for the system under consideration is several hundred pages long.

Figure 5A:
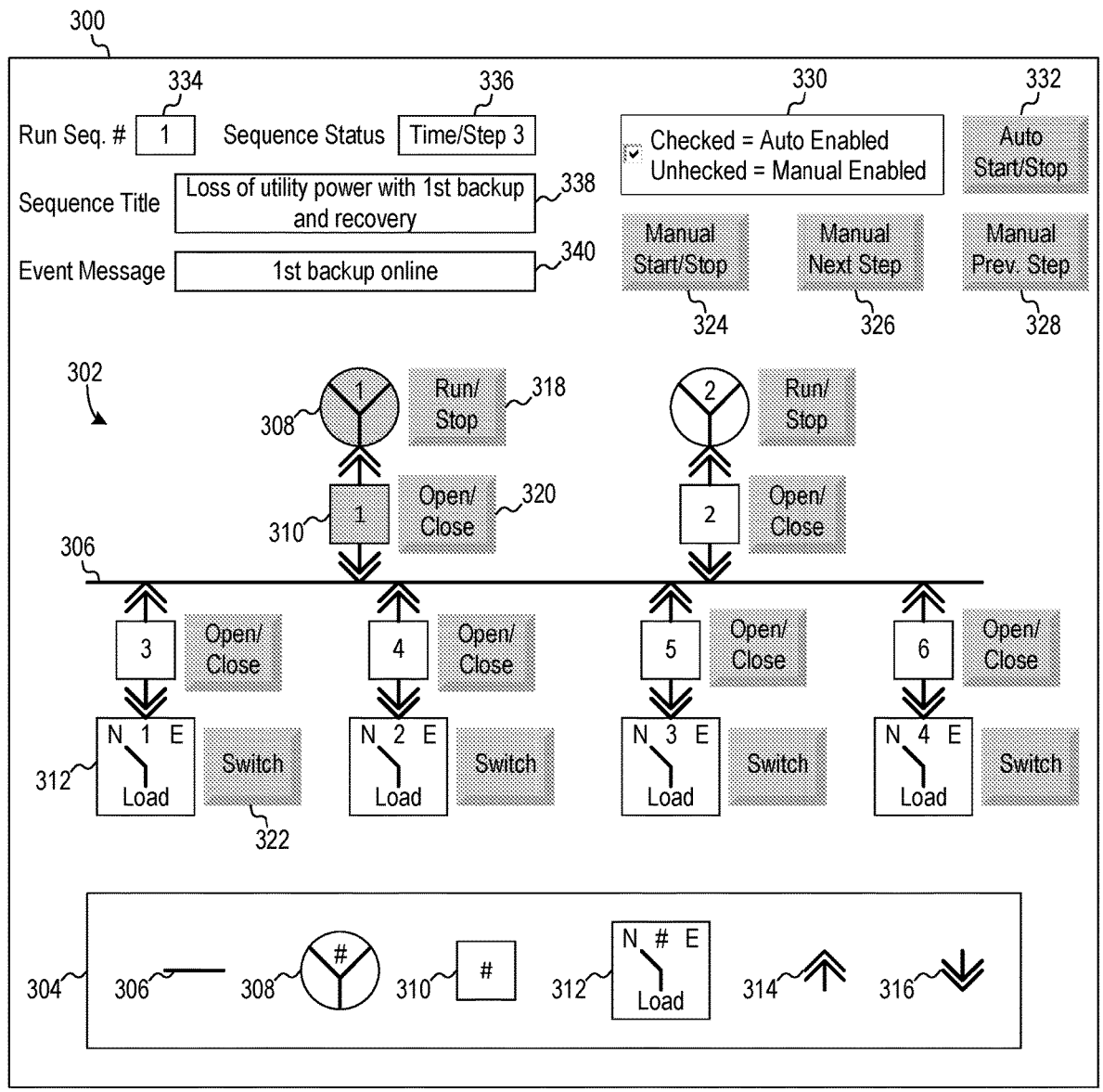
FIGS. 5A-5C are exemplary animations of a PCS model according to embodiments of this disclosure.
Figure 5B:
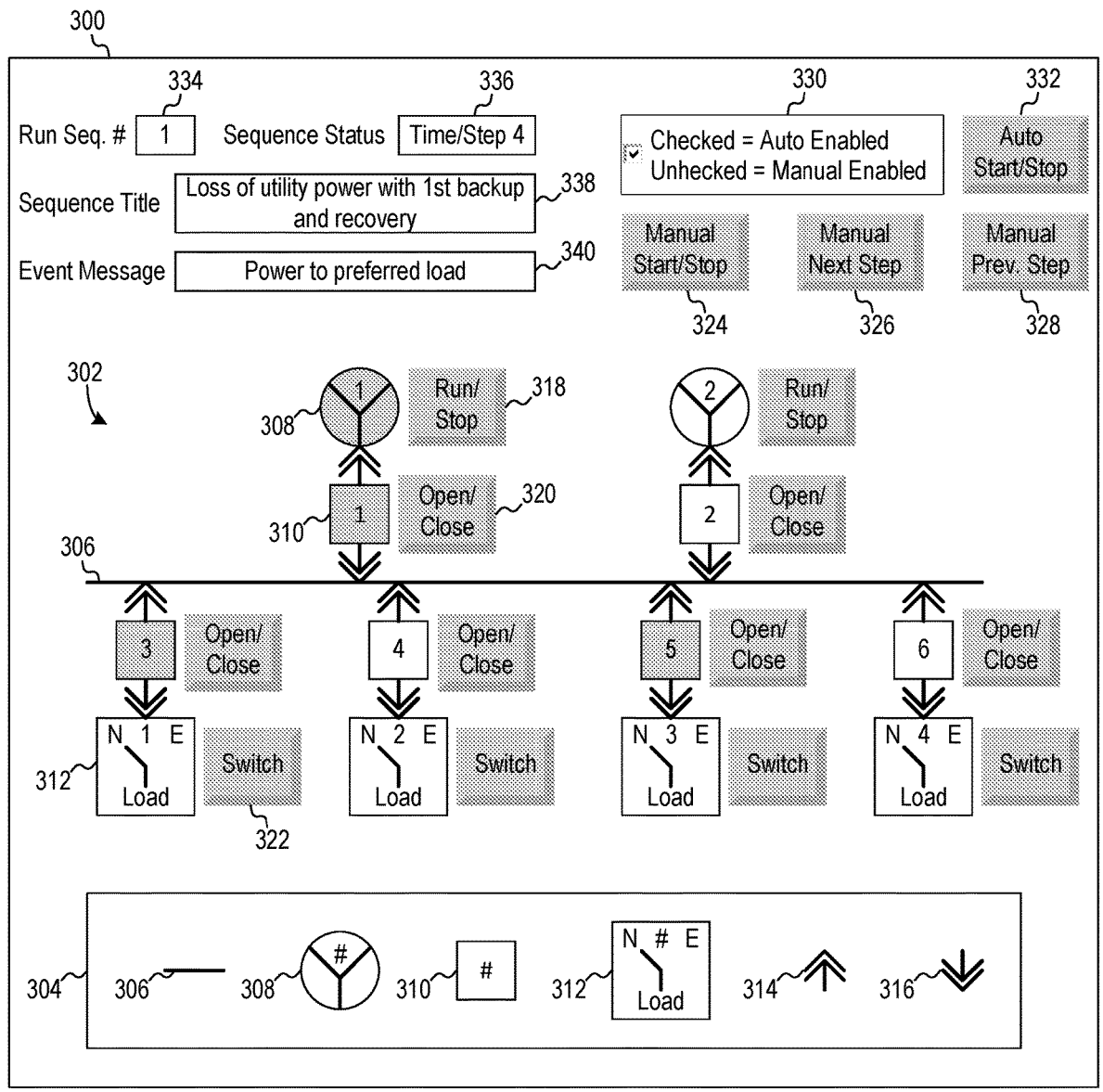
Figure 5C:
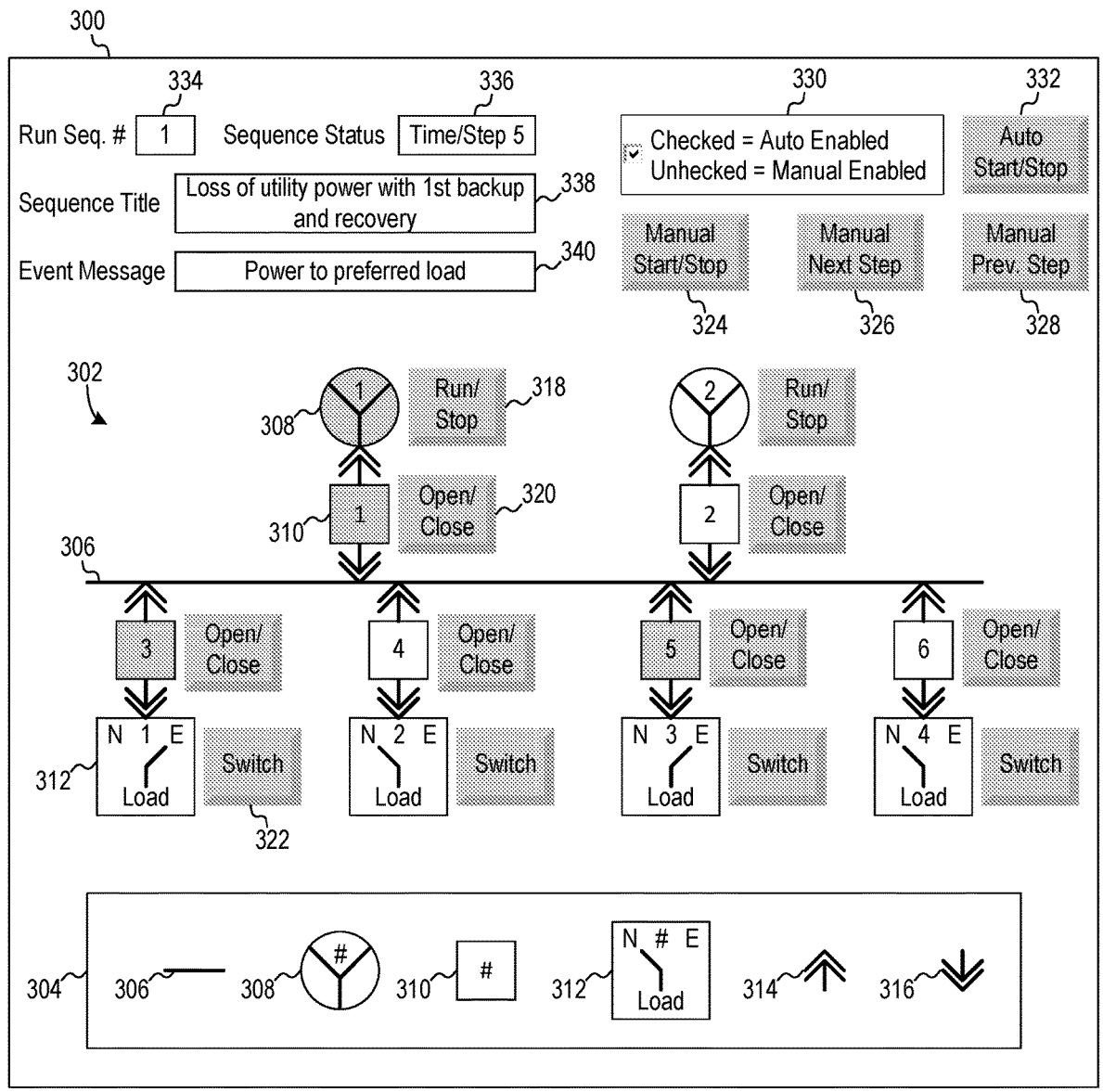

FIGS. 5A-5C illustrate an exemplary graphical animation of Sequence #1 from FIG. 4. Referring to FIG. 5A, the sequence has been started and it can be seen that the images for the first generator and circuit breaker, GEN1 and CB1, have changed relative to their starting condition images (e.g., from white to green and from green to red, respectively), indicating GEN1 has been started and CB1 has been closed. The images for the second generator and circuit breaker, GEN2 and CB2, remain unchanged from their starting condition images. The Sequence Status field 336 indicates the sequence is currently at Time/Step 3, and the Event Message field 340 indicates that the first backup is coming online.

In FIG. 5B, the images for the third and fifth circuit breakers, CB3 and CB5, have changed relative to their starting condition images (e.g., from red to green), indicating these circuit breakers have been closed. The images for the fourth and sixth circuit breakers, CB4 and CB6, remain unchanged from their starting condition images. The Sequence Status field 336 indicates the sequence is currently at Time/Step 4, and the Event Message field 340 indicates that power is going to a preferred load.

In FIG. 5C, the images for the first and third transfer switches, ATS1 and ATS3, have changed relative to their starting condition images (e.g., from Normal to Emergency), indicating these switches have switched to emergency power. The images for the second and fourth transfer switches, ATS2 and ATS4, remain unchanged from their starting condition images. The Sequence Status field 336 indicates the sequence is currently at Time/Step 5, and the Event Message field 340 indicates that power is going to a preferred load. The PCS model builder 222 continues in this manner until the final Time/Step row for Sequence #1 is reached, Time/Step 10, at which point the process stops.

Numerous PCS models like the one shown in FIG. 3 may be built and edited and numerous PCS sequences like the one shown in FIG. 4 may be built and edited for each model. Each PCS model may be stored or saved (e.g., on storage device 210 or in main memory 204) as a separate file using an appropriate file format (e.g., .txt, .csv, .xls, etc.) and likewise each PCS sequence may be stored or saved as a separate file using an appropriate file format. Alternatively, where embodiments of the present disclosure are implemented using Microsoft Excel or similar software, the PCS model may be defined in one tab, each PCS sequence for that model may be defined in a separate tab, and the model and sequence tabs may be saved together as one Excel workbook. Following is a description of an exemplary implementation using Microsoft Excel.

Code Subroutine Name "StartingConditions"

This subroutine looks for text strings in the starting conditions field in the following format:
GEN #_ON
GEN #_OFF
CB #_CLOSED
CB #_OPEN
ATS #_ON_E
ATS #_ON_N
ATS #_OFF_E
ATS #_OFF_N
ATS #_OFF_C
ATS #_OFF_C The subroutine starts searching the text strings in the starting conditions field looking for strings where #=1:
GEN1_ON
GEN1_OFF
CB1_CLOSED
CB1_OPEN
ATS1_ON_E
ATS1_ON_N
ATS1_OFF_E
ATS1_OFF_N
ATS1_OFF_C
ATS1_OFF_C If any such strings are found, the subroutine will update the appropriate one-line diagram object. Each one-line diagram object has a name, such as circuit breakers. Within each circuit breaker object is a square called CB #_COLOR. This variable is linked to the color of the circuit breaker shown on the one-line diagram. Thus, if the CB1_CLOSED string was found, then CB1_COLOR would be changed to RED. If CB1_OPEN was found, then CB1_COLOR would be changed to GREEN. When this happens, the color of the circuit breaker object on the one-line diagram changes.

Generator objects have a similar color variable, GEN #_COLOR, and work in a similar way as circuit breaker objects. If the GEN1_ON string was found, then GEN1_COLOR would change to RED. If GEN1_OFF was found, then GEN1_COLOR would change to WHITE. The one-line diagram objects would be updated with the new colors.

Transfer switches do not change color in this implementation. They change so that their switch positions can be seen, such as an ATS connected to Normal, connected to Emergency, or in the Center (off). The ATS have switch variables, ATS #_E, ATS #_N, ATS #_C, that render the switch position visible or not visible. If any of the ATS commands are found, the respective switch variables ATS #_E, ATS #_N, ATS #_C are updated to make their switch positions either visible or not visible. For example:

ATS1_ON_E, if found in the starting conditions field, would make the ATS1_E variable, which represents the ATS being connected to the emergency source, become visible.

ATS1_OFF_E, if found in the starting conditions field, would make the ATS1_E variable, which represents the ATS being not connected to the emergency source, become not visible.

ATS1_ON_N, if found in the starting conditions field, would make the ATS1_N variable, which represents the ATS being connected to the normal source, become visible.

ATS1_OFF_N, if found in the starting conditions field, would make the ATS1_N variable, which represents the ATS being not connected to the normal, become not visible.

ATS1_OFF_C, if found in the starting conditions field, would make the ATS1_C variable, which represents the ATS showing its contacts in the center-off position, become visible.

ATS1_OFF_C, if found in the starting conditions field, would make the ATS1_C variable, which represents the ATS not showing its contacts in the center-off position, become not visible.

The subroutine then increments the device number variable #and loops back to the start, keeping track of the current device number. It will continue looking until all circuit breakers, generators, and ATS are accounted for. All devices are scanned very quickly, usually in far less than a second.

Code Subroutine Name "ModifySequence"

When the timer count goes to one second, subroutine "ModifySequence" is called to run the sequence starting with the operation at Time=1. This subroutine is similar to the "StartingConditions" subroutine except for the following modifications:

The place that the subroutine looks for the user plain text sequence command is changed to the next row at each time interval. At the end of the subroutine, the one-line diagram is updated with the value of the timer. The one-line diagram screen graphics are updated just as they were with the "StartingConditions" code, but now it uses the user plain text sequence code at time interval row 1.

When the timer counts to two seconds, the "ModifySequence" subroutine is run again. After each second of the timer clock, the "ModifySequence" subroutine is called and run.

The subroutine continues running sequence operations until Time is greater than the maximum number of sequence operations set in the sequence screen (tab) by the user (i.e., to tell the subroutine how many sequence operations the sequence will have). The timer stops at the end of the sequence. The Start/Stop button may be pressed again, and the process repeats itself with the timer being restarted at 0, the starting conditions being applied, and each sequence operation being run.

Following are exemplary steps a user could use to create a sequence. On the one-line diagram screen, there are objects below the one-line diagram that can be dragged and dropped onto the one-line diagram to build a model of a PCS. After building the model, the user goes to the sequence screen (tab) and defines the starting conditions, separating each command by a comma. For example, if the one-line diagram was composed of two generators and three circuit breakers, the user would define the starting state of all five components using the following text string: "GEN1_OFF, GEN2_OFF, CB1_OPEN, CB2_OPEN, CB3_OPEN." This would define the starting conditions for all generators as not running and all circuit breakers as open.

Next, for each time row, the user can specify in the sequence operation row how the devices would change from their initial conditions. For example, if the user wants generator 1 to run at time 1 second, then the following command would be entered in the corresponding sequence operation row: "GEN1_ON." Or multiple commands could be entered: "GEN1_ON, GEN2_OFF, CB1_OPEN, CB2_OPEN, CB3_OPEN."

If the user wants to put in a brief wait period between consecutive commands, the sequence operation rows can be left blank for the desired number of time rows, with one second (or a different time unit) elapsing for each time row. The time row would appear with a time marking, but the sequence operation row would be blank.

If the user desires more than one sequence for the model, any sequence screen (tab) can be copied and duplicated to create a new sequence. The user can then continue building a sequence in the new screen from where the old sequence left off.

Thus far, specific embodiments of the present disclosure have been described. Following now is a general method that may be used to implement embodiments of the present disclosure.

Figure 6:
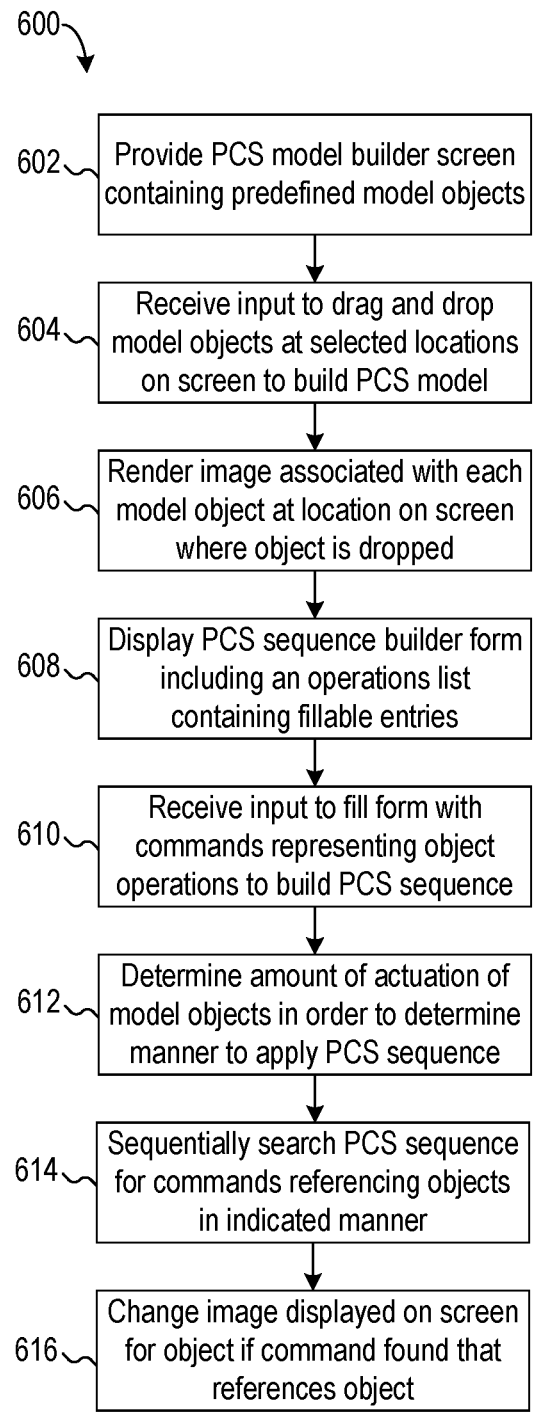
FIG. 6 is a flow diagram illustrating a method of demonstrating a PCS sequence according to embodiments of this disclosure.

Referring to FIG. 6, a flow diagram of an exemplary method 600 is shown that may be used to graphically demonstrate PCS operating sequences according to embodiments of the present disclosure. The method generally begins at 602, where a PCS model builder screen is displayed on a display (e.g., display device 210). The PCS model builder screen may include a workspace to build or edit a PCS model, and an object selection area containing predefined model objects representing various PCS components. A plurality of user controls are also provided in the model builder screen in some embodiments, including interface controls and model object controls. At 604, input is received to drag and drop one or more model objects from the object selection area onto desired locations in the workspace to build or edit the PCS model. At 606, an image associated with each model object is rendered, displayed, or presented at a location in the workspace where the model object is dropped. In this way, model objects can be positioned at selected locations relative to other model objects within the workspace to quickly and easily build or edit a PCS model.

Next, at 608, a PCS sequence builder form is displayed on the display to define a PCS sequence for the PCS model. The PCS sequence builder form includes, among other things, an operations list having a plurality of fillable entries. A sequence identification field, a number of events field, a starting conditions field, and a time/step field are also included in some embodiments. Additionally, a sequence title field and an events information list may also be included in the sequence builder form in some embodiments. At 610, input is received to fill in the entries in the operations list with commands representing object operations. The sequence identification field, number of events field, and starting conditions field are also filled in some embodiments. In some embodiments, the time/step field is generated and incremented automatically when a corresponding entry in the operations list is filled in. The user can also fill in the sequence title field and the event information list in some embodiments. In this way, the user can specify which operation is performed by which model object and the timing or order for the operation to build the PCS sequence.

Thereafter, at 612, the amount of actuation of the model objects is determined in order to determine the manner in which to apply the PCS sequence to the PCS model. At 614, the PCS sequence is applied to the PCS model in the manner indicated by the amount of actuation. Applying the PCS sequence to the PCS model involves sequentially searching the PCS sequence for any commands that reference the model objects in the PCS model. The searching is done in a controlled manner depending on the manner indicated by the amount of actuation of the model objects. This may include automatically running through the entire sequence at a certain speed based on the time delay between steps that is set by the user. The user can also manually step through a portion or all of the sequence in either forward or reverse direction using the appropriate interface controls in the PCS model builder screen. At 616, the image presented on the model builder screen for a model object is changed when a command referencing the model object is found in the PCS sequence. The changing of the image appears as movement or motion, giving the appearance of animation of the model object.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A system for graphically demonstrating a power control system (PCS) sequence, comprising:
   a display;
   a processor coupled to control operation of the display; and
   a storage device coupled to communicate with the processor, the storage device storing a PCS sequencer thereon that, when executed by the processor, causes the system to:
   display a PCS model builder screen on the display, the PCS model builder screen including a workspace to build or edit a PCS model, and an object selection area containing predefined model objects that are dragged and dropped onto the workspace to build or edit the PCS model, each model object representing a PCS component, the PCS model builder screen presenting an image associated with each model object at a location in the workspace where said model object is dropped;
   display a PCS sequence builder form on the display to define a PCS sequence for the PCS model, the PCS sequence builder form including an operations list having a plurality of entries, each entry being filled in with one or more commands for the model objects in the PCS model, each command representing a model object operation;
   determine an amount of actuation of the model objects, from an interface control, the amount of actuation indicating a manner in which the system applies the PCS sequence to the PCS model; and
   apply the PCS sequence to the PCS model in the manner indicated by the amount of actuation on the PCS model builder screen, wherein the PCS model builder screen changes the image presented in the workspace for a model object based on a command in the operations list for said model object, the changing of the image appearing as animation of said model object.

2. The system of claim 1, wherein the PCS sequence builder form displayed by the system further includes a sequence identification field that is filled in with a sequence identifier for the PCS sequence.

3. The system of claim 1, wherein the PCS sequence builder form displayed by the system further includes a starting condition field that is filled in with a starting condition for each model object in the PCS model.

4. The system of claim 1, wherein the PCS model builder screen displayed by the system further includes a plurality of model object controls that control the model objects.

5. The system of claim 1, wherein the system applies the PCS sequence in the manner indicated by the amount of actuation by applying the PCS sequence to the PCS model automatically at a specified speed.

6. The system of claim 1, wherein the system applies the PCS sequence in the manner indicated by the amount of actuation by applying the PCS sequence to the PCS model as controlled via the interface control.

7. The system of claim 1, wherein the system stores the PCS model and the PCS sequence together as one file.

8. A method for graphically demonstrating a power control system (PCS) sequence, comprising:
    displaying a PCS model builder screen on a display, the PCS model builder screen including predefined model objects, each model object representing a PCS component;
    receiving input to drag and drop one or more predefined model objects to selected locations on the screen to build or edit the PCS model;
    presenting an image associated with each model object at a location on the screen where said model object is dropped;
    displaying a PCS sequence builder form on the display to define a PCS sequence for the PCS model, the PCS sequence builder form including an operations list having a plurality of entries;
    receiving input to fill in each entry with one or more commands for the model objects in the PCS model, each command representing a model object operation;
    determining an amount of actuation of the model objects, from an interface control, the amount of actuation indicating a manner in which the PCS sequence is searched; and
    sequentially searching the PCS sequence in the manner indicated by the amount of actuation on the PCS model builder screen; and
    changing the image presented on the screen for a model object in response to finding a command in the operations list referencing said model object, the changing of the image appearing as animation of said model object.

9. The method of claim 8, wherein displaying the PCS sequence builder form further includes displaying a sequence identification field that is filled in with a sequence identifier for the PCS sequence.

10. The method of claim 8, wherein displaying the PCS sequence builder form further includes displaying a starting condition field that is filled in with a starting condition for each model object in the PCS model.

11. The method of claim 8, wherein displaying the PCS model builder screen further includes displaying a plurality of model object controls that control the model objects.

12. The method of claim 8, wherein sequentially searching in the manner indicated by the amount of actuation includes searching the PCS sequence automatically at a specified speed.

13. The method of claim 8, wherein sequentially searching in the manner indicated by the amount of actuation includes searching the PCS sequence as controlled via the interface control.

14. The method of claim 8, further comprising storing the PCS model and the PCS sequence together as one file.

15. A non-transitory computer-readable medium comprising computer-readable instructions for graphically demonstrating a power control system (PCS) sequence, the computer-readable instructions comprising instructions for causing a processor to:
    display a PCS model builder screen on a display, the PCS model builder screen including predefined model objects, each model object representing a PCS component;
    receive input from the user to drag and drop one or more predefined model objects to selected locations on the screen to build or edit the PCS model;
    present an image associated with each model object at a location on the screen where said model object is dropped;
    display a PCS sequence builder form on the display to define a PCS sequence for the PCS model, the PCS sequence builder form including an operations list having a plurality of entries;
    receive input to fill in each entry with one or more commands for the model objects in the PCS model, each command representing a model object operation;
    determine an amount of actuation of the model objects, from an interface control, the amount of actuation indicating a manner in which the PCS sequence is searched; and
    sequentially search the PCS sequence in a manner indicated by the amount of actuation on the PCS model builder screen; and
    change the image presented on the screen for a model object in response to finding a command in the operations list referencing said model object, the changing of the image appearing as animation of said model object.

16. The non-transitory computer-readable medium of claim 15, wherein the processor further displays a sequence identification field in the PCS sequence builder form that is filled in with a sequence identifier for the PCS sequence.

17. The non-transitory computer-readable medium of claim 15, wherein the processor further displays a starting condition field in PCS sequence builder form that is filled in with a starting condition for each model object in the PCS model.

18. The non-transitory computer-readable medium of claim 15, wherein the processor further displays a plurality of model object controls in the PCS model builder screen that control the model objects.

19. The non-transitory computer-readable medium of claim 15, wherein the processor searches in the manner selected by the user by searching the PCS sequence automatically at a specified speed.

20. The non-transitory computer-readable medium of claim 15, wherein the processor searches in the manner indicated by the amount of actuation by searching the PCS sequence as controlled via the interface control.

\* \* \* \* \*